Jan. 10, 1956  J. C. KARLSON  2,730,664
INDUCTION SIGNAL MOTOR-OPERATED DIFFERENTIAL TRANSFORMER
Filed March 27, 1953

INVENTOR.
JOHN C. KARLSON
BY
ATTORNEY

United States Patent Office 2,730,664
Patented Jan. 10, 1956

2,730,664

INDUCTION SIGNAL MOTOR-OPERATED DIFFERENTIAL TRANSFORMER

John C. Karlson, Brooklyn, N. Y., assignor to Bendix Aviation Corporation, Teterboro, N. J., a corporation of Delaware Application March 27, 1953, Serial No. 345,073

8 Claims. (Cl. 318—31)

The present invention relates to electrical systems and more particularly to an induction signal motor-operated differential transformer.

An induction signal transformer is primarily a device which is designed to produce a voltage output and must be matched to a high impedance load which requires little or no current for its operation. In some applications it is desirable to have a fairly large current output.

The present invention provides an induction signal transformer in which an induction signal motor drives a laminated pole piece having a semi-circular configuration and which coacts with a differential transformer having E-type laminations. A primary winding is wound around the center leg and secondary windings are wound around the outer legs. The voltage induced in the secondary coils is dependent upon the position of the rotor which varies the flux paths.

It is an object of the present invention to provide an induction signal transformer having a large current output.

Another object of the invention is to provide an improved induction signal transmitter.

Another object of the invention is to provide an improved inductive pickup device.

The above and other objects and features of the invention will appear more fully hereinafter from a consideration of the following description taken in connection with the accompanying drawing wherein one embodiment of the invention is illustrated by way of example.

Figure 1:
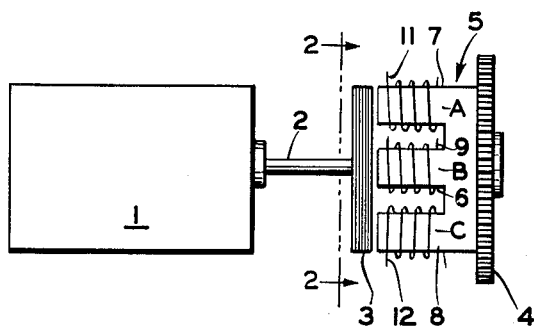
Figure 1 is a diagrammatic presentation of an inductive signal motor and inductive transformer embodying the invention.
Figure 2:
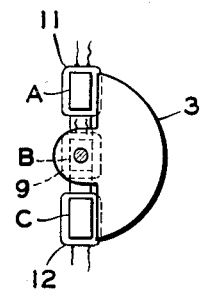
Figure 2 is a view along the line 2—2 of Figure 1.

Referring now to Figures 1 and 2, an inductive signal motor is indicated generally by the numeral 1 and has an output shaft 2. Mounted on the output shaft 2 is a laminated rotor 3 having a substantially semi-circular configuration as may best be seen in Figure 2. Attached to gear 4 which may be connected to a follow-up system (not shown) is an E-type laminated structure 5 having a center leg 6 and outer legs 7 and 8. A primary winding 9 is wound around the leg 6 and may be connected to a suitable source of alternating current (not shown). Secondary windings 11 and 12 are wound around the respective legs 7 and 8 and may be connected in series opposition so that a null voltage is present when the fluxes are coequal.

Movement of the inductive signal motor rotates the pole piece 3 which, depending upon its position relative to the legs 7 and 8, changes the flux path between the legs 6 and 7 and 6 and 8 so that a resulting voltage will appear in the output of the windings 11 and 12. The output from the windings 11 and 12 may be used to operate an amplifier (not shown) or to furnish the power for a small motor or the like.

Figure 3:
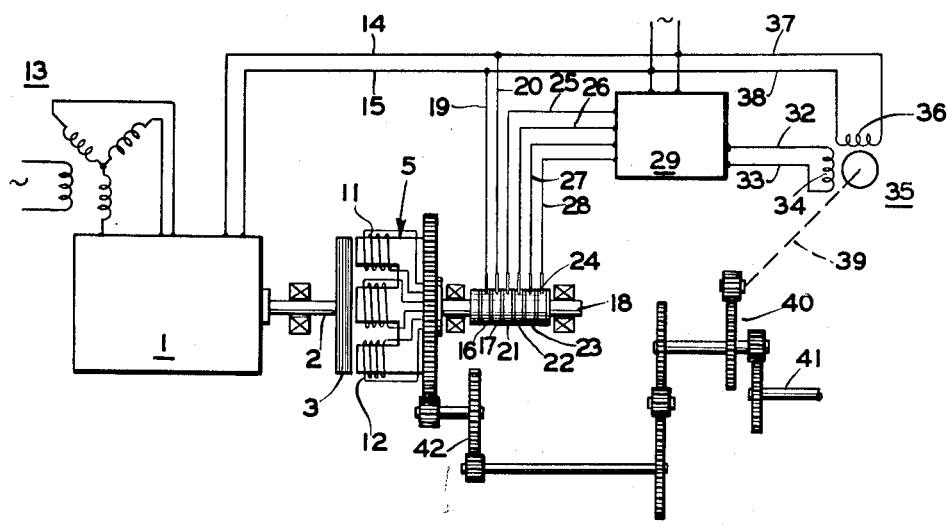
Figure 3 illustrates a system embodying the invention.

Referring now to Figure 3 wherein like parts will be assigned the same reference numerals as those in Figures 1 and 2, the induction signal motor 1 is connected to the output of an induction signal transmitter 13. The motor 1 is also connected to a source of alternating current (not shown) by conductors 14 and 15. The position of the motor 1 determines the position of the pole piece 3 with respect to the transformer 5.

The winding 9 is connected through slip rings 16 and 17 carried by shaft 18 connected to the gear 4. The slip rings 16 and 17 are connected by conductors 19 and 20 across a source of alternating current (not shown). The secondary winding 11 is connected to slip rings 21 and 22 and the winding 12 is connected to slip rings 23 and 24. The slip rings 21, 22, 23 and 24 are connected by conductors 25, 26, 27 and 28 respectively to the input of amplifier 29. The amplifier 29 may be connected by conductors 30 and 31 to the source of alternating current. The windings 11 and 12 are proportioned and connected so that they are equal and opposite upon the core 3 being in the neutral position.

The output of the amplifier may be connected by conductors 32 and 33 to signal winding 34 of a two-phase motor 35. A fixed phase winding 36 of the motor 35 may be connected by conductors 37 and 38 across the source of alternating current. The motor 35 may be connected through shaft 39 and suitable gearing 40 to an output shaft 41 connected to a suitable load (not shown). The motor 35 also drives through suitable gearing 42 the gear 4 which tends to restore the device 5 to the null position.

In operation, upon a signal being received by the motor 1, the motor which rotates the pole piece 3 and shifts it relative to the windings 11 and 12, causing a change in the flux paths thereof. The output from the transformer 5 is dependent in magnitude and phase upon the direction and amount of rotation of the pole piece 3. This output is fed through amplifier 29 and actuates the control motor 35 in a direction dependent upon the direction of the unbalance between the windings 11 and 12. The motor 35 also drives through reduction gearing 42 the gear 3 which tends to rotate the structure 5 to a null position. Although only one embodiment of the invention has been illustrated and described, various changes in the form and relative arrangement of the parts, which will now appear to those skilled in the art may be made without departing from the scope of the invention.

I claim:

1. A pick-off device for generating a signal in response to relative displacement between two relatively rotatable members comprising a transformer having an E-type core mounted on one of said members, said transformer having secondary windings on the outer legs of said core and a primary winding on the center leg of said core, an arcuate magnetic armature mounted on the other of said devices and having an extension thereon adapted to overlap said center leg in any position thereof, said arcuate portion cooperating with said outer legs in a differential manner with respect to each other to vary the magnet flux between the primary winding and the secondary windings, and means for connecting said secondary windings for obtaining an output voltage having a phase and magnitude corresponding to the relative displacement between said members.

2. In a signal transmitting system, a two-element signal pick-off, one element comprising a transformer including an E-type core having a primary winding on the center leg and secondary windings on the outer legs of the core connected in series opposition, the transformer being rotatable about an axis passing longitudinally of said center winding, the other element comprising a circumferentially unsymmetrical armature rotatable in a path adjacent to the free ends of said legs about an axis extending in the same direction as the transformer axis; means for rotating one of said elements and thereby shifting the armature circumferentially from a selected position relative to said secondary windings, thereby changing the relative magnetic fields of the latter windings; and means for rotating the other element and thereby returning the armature to said selected relative position.

3. A system as claimed in claim 2 in which the induction of said outer windings is equal and opposite, and the armature in said selected position is symmetrically located in the magnetic fields of the outer windings, whereby the transformer output is substantially zero with the armature in said position.

4. A signal transmitting system as claimed in claim 2 in which the armature includes an arcuate section coaxial with said armature axis.

5. A signal pick-off device, comprising a transformer including an E-type core having a primary winding on the center leg and secondary windings on the outer legs connected in series opposition, the transformer being rotatable about an axis passing longitudinally of said center winding, and an associated circumferentially unsymmetrical armature rotatable in a path adjacent to the free ends of said legs about an axis extending in the same direction as the transformer axis, arranged to vary the relative reluctance of the magnetic circuits of said secondary windings by relative rotation of said armature and transformer.

6. A device as claimed in claim 5 in which the armature includes an arcuate section concentric with said armature axis.

7. A device as claimed in claim 5 in which the armature comprises a semicircular section coaxial with said armature axis.

8. A device as claimed in claim 5 in which the armature includes a central portion circumferentially symmetrically located in alignment with the center winding of the transformer in all angular positions of the armature, and a peripheral portion connected to the central portion and unsymmetrical with relation to the outer windings.

References Cited in the file of this patent

UNITED STATES PATENTS

| | | |
|---|---|---|
| 2,139,558 | Moseley et al. | Dec. 6, 1938 |
| 2,407,657 | Esval | Sept. 17, 1946 |
| 2,419,979 | Wilson | May 6, 1947 |
| 2,448,564 | Wilkerson | Sept. 7, 1948 |
| 2,452,609 | Somers et al. | Nov. 2, 1948 |

FOREIGN PATENTS

| | | |
|---|---|---|
| 417,995 | Great Britain | Oct. 11, 1934 |